United States Patent [19]

Hake

[11] Patent Number: 4,606,413

[45] Date of Patent: Aug. 19, 1986

[54] HYDRAULIC LEVELER ARRANGEMENT

[75] Inventor: Kenneth A. Hake, Beloit, Kans.

[73] Assignee: Kent Manufacturing Co., Inc., Tipton, Kans.

[21] Appl. No.: 705,368

[22] Filed: Feb. 25, 1985

[51] Int. Cl.[4] .............................................. A01B 59/00
[52] U.S. Cl. ................................. 172/328; 280/415 R
[58] Field of Search .................... 280/415.5; 172/326, 172/327, 328, 413

[56] References Cited

U.S. PATENT DOCUMENTS

| | | | |
|---|---|---|---|
| 1,653,677 | 12/1927 | Strandlund | 172/328 |
| 1,653,678 | 12/1927 | Strandlund | 172/328 |
| 1,653,695 | 12/1927 | Brown | 172/328 |
| 1,675,461 | 7/1928 | Paul | 172/328 |
| 2,717,479 | 9/1955 | Scheidenhelm et al. | 172/328 |
| 2,780,475 | 2/1957 | Koerner | 280/414.5 |
| 2,970,656 | 2/1961 | Kampe | 172/328 |
| 3,187,822 | 6/1965 | Clifford et al. | 172/328 |
| 3,202,225 | 8/1965 | Richardson | 172/328 |
| 3,207,233 | 9/1965 | Shumaker | 172/316 |
| 3,292,714 | 12/1966 | Tsuchiya et al. | 172/583 |
| 3,356,382 | 12/1967 | Fay | 172/413 |
| 3,534,819 | 10/1970 | Grover | 172/316 |
| 3,583,495 | 6/1971 | Castral | 172/328 |
| 3,648,780 | 3/1972 | Fueslein et al. | 172/413 |
| 3,658,362 | 4/1972 | Fackler et al. | |
| 3,666,284 | 5/1972 | Hunter et al. | |
| 3,759,332 | 9/1973 | Robertson, Sr. | 172/413 |
| 3,762,480 | 10/1973 | Hofer | 172/328 |
| 3,777,823 | 12/1973 | Holfeld | 172/328 |
| 3,830,313 | 8/1974 | Frager et al. | 172/311 |
| 3,912,017 | 10/1975 | Rehn | 172/328 |
| 3,912,018 | 10/1975 | Brundage et al. | 172/328 |
| 3,918,529 | 11/1975 | Frager et al. | 172/328 |
| 4,108,249 | 8/1978 | Anderson et al. | 172/328 |
| 4,150,724 | 4/1979 | Strobel | |
| 4,301,873 | 11/1981 | Baxter | |
| 4,326,594 | 4/1982 | Oka | 172/328 |
| 4,373,591 | 2/1983 | Schaaf et al. | 172/328 |
| 4,428,435 | 1/1984 | Hubbard et al. | 172/328 |
| 4,450,917 | 5/1984 | Hake | 172/328 |

FOREIGN PATENT DOCUMENTS 2019703  11/1979  United Kingdom ............... 142/328

Primary Examiner—Richard J. Johnson
Attorney, Agent, or Firm—Litman, Day and McMahon

[57] ABSTRACT

An agricultural implement frame supported on rockshaft mounted tires and having a rigidly mounted tongue employs a hydraulic leveler arrangement to maintain the level or pitch of the frame in the raised transport position and the lowered ground working position of the frame. The leveler arrangement includes a hitch bell crank pivotally connected to the frame lift mechanism. A hitch member is pivotally connected to the hitch bell crank. The bell crank is in the form of an adjustable truss and includes a pair of lift arms and a pair of triangular hitch arms the ends of which are connected by a turnbuckle. By adjusting the length of the turnbuckle, the pitch of the frame is made adjustable. The force of the lift cylinder to lift the frame is transferred about the hitch member to the front end of the frame to lift same as the rest of the frame is lifted. The arrangement operates in the reverse direction as the frame is lowered.

12 Claims, 5 Drawing Figures

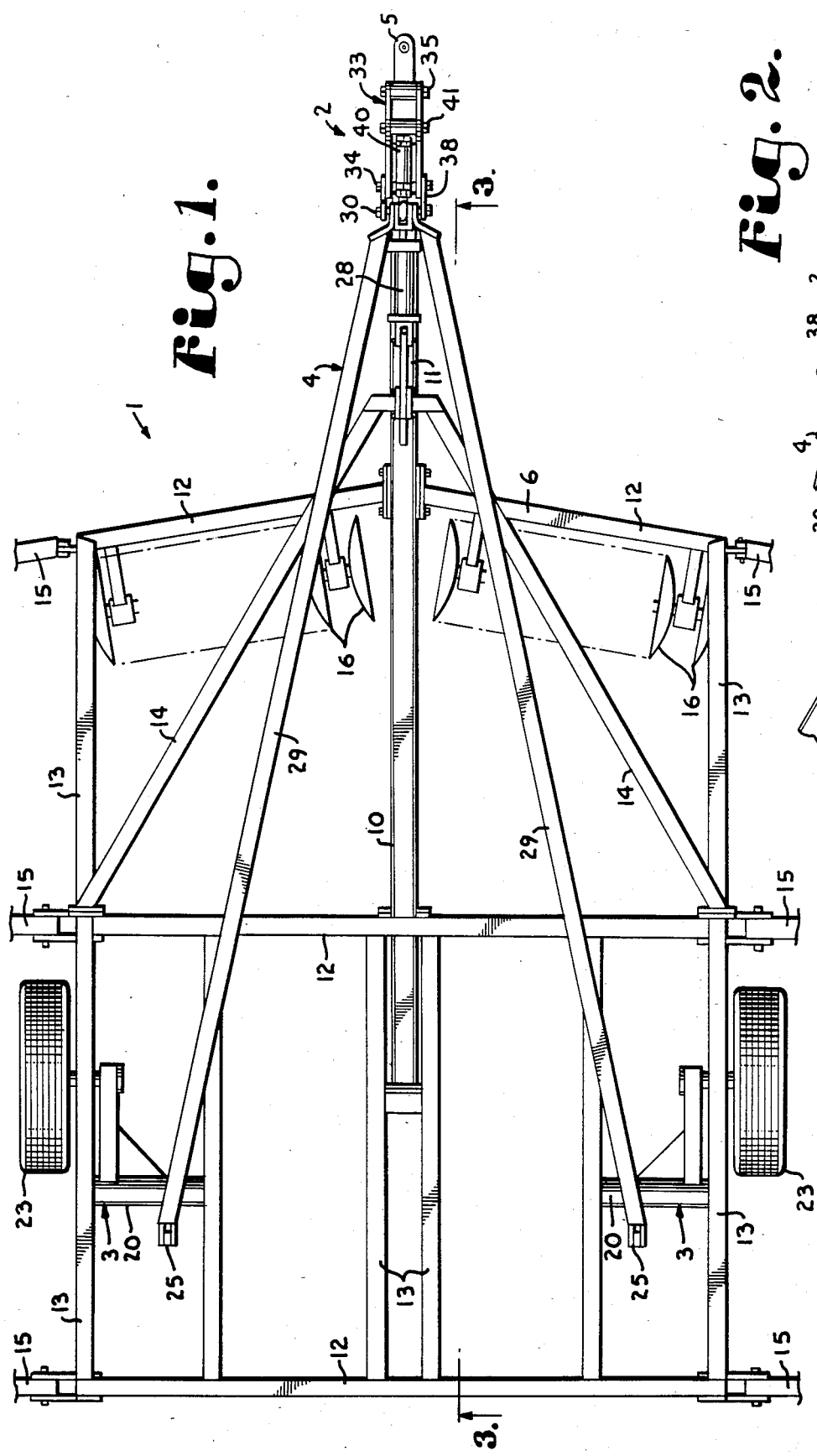
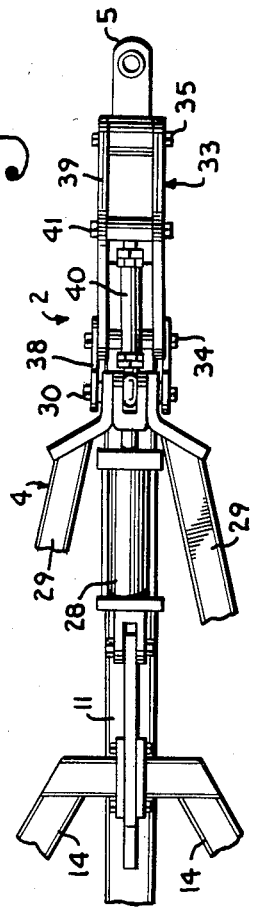

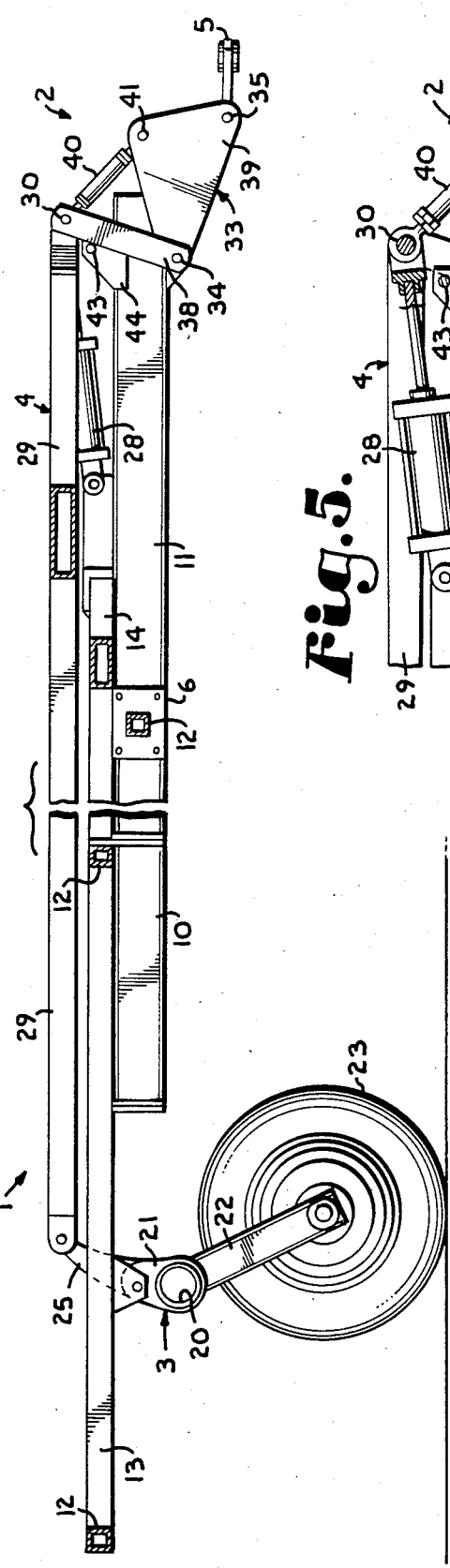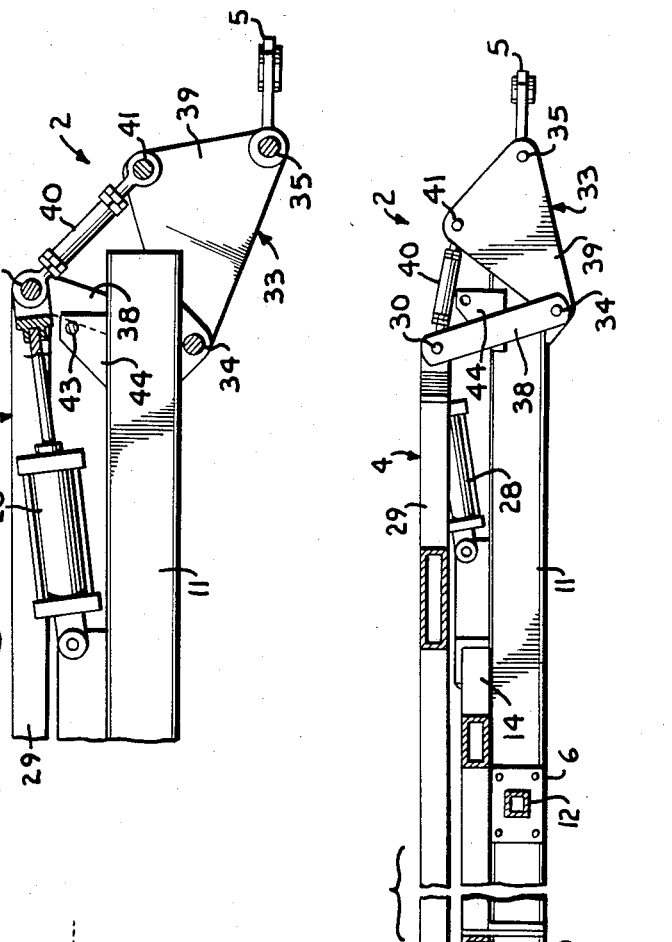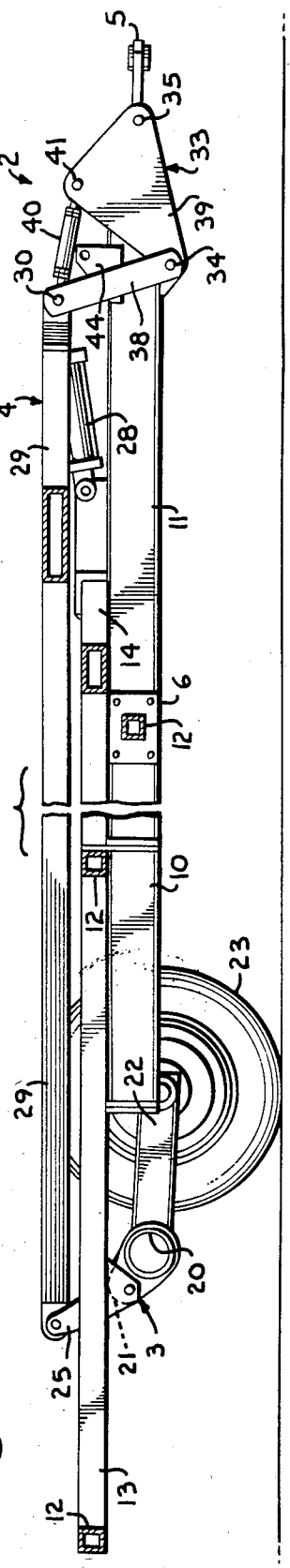

HYDRAULIC LEVELER ARRANGEMENT

FIELD OF THE INVENTION

The present invention relates to agricultural implement frame leveling arrangements and, more particularly, to such an arrangement employing an adjustable bell crank mechanism to transfer the lifting and lowering motions of the frame lifting cylinder to the hitch member for frame leveling and frame pitch angle adjustments.

BACKGROUND OF THE INVENTION

In order to reduce fuel consumption and man-hours in soil working, agricultural implement frames are often equipped with several lateral rows of tillage tools at forward, median and rear positions. When tillage tools are thus arrayed, it is necessary for the implement frame to be level in the soil working position to ensure uniform penetration of the tools from front to back and in the transport position to prevent undesired digging in of the tools when traveling over uneven ground. There are many arrangements in the prior art for leveling of clevis hitch connected agricultural implement frames. The simplest frame leveling arrangements from a functional standpoint are those which are strictly manual, wherein the pitch or angular orientation of the frame about a lateral axis is manually adjusted either in the lowered soil working position of the frame or in the raised transport position of the frame. However, such manual adjustments can be laborious, time-consuming and hazardous depending on the particular mechanism employed. Therefore, automatic or self-leveling arrangements which maintain or substantially maintain the pitch of the frame as it is converted between working and transport positions are preferred.

Although some frames are leveled by hydraulic means, the majority are leveled by mechanical means. Agricultural frames which are not supported entirely by the associated tractor are usually supported by tires which are arranged in a lateral line across the frame, such that in the transport position the frame is a semitrailer. The mechanical leveling mechanisms transfer the motion of the frame lift mechanism in reverse sense or direction to the hitch member. Since the hitch member is fixed vertically by connection to the tractor, the frame front end reacts against the hitch to maintain the pitch of the frame. For example, in lifting the frame to the transport position, the frame lifting motion is transmitted to the hitch member as a downward force. Since the hitch member cannot move vertically, the force is transmitted back to the front end of the frame to lift same as the rest of the frame is lifted. Self-leveling of the frame during lowering to the working position occurs according to the same principles. There are many mechanisms in the prior art for transferring the lifting and lowering forces from a lift mechanism of a frame to the hitch member for frame leveling purposes. Such leveling mechanisms tend to be mechanically complex, involving many links, levers, pivots, and the like. Multitudinous mechanical parts entail higher manufacturing costs and require greater expenditures of time for periodic inspection and maintenance. In addition to automatic leveling of the frame as its height above ground is changed, leveling arrangements often include an adjustable member for adjusting the pitch angle of the frame in one or more positions of the frame. Many such pitch adjustment mechanisms are so positioned on the frame that an operator must risk life and limb to adjust the pitch of the frame. For example, on a frame wherein the pitch is adjusted by a telescoping link, the frame is lifted to the transport position by the lift mechanism, an operator climbs onto the frame and removes a pin from the telescoping link and, as the lift mechanism is slowly operated, the operator guides the telescoping members to the proper set of apertures and replaces the pin. One common mechanical component of frame leveling mechanisms is the bell crank. However, all bell cranks in known use on frame leveling mechanisms are rigid; that is, the angular relationship between the arms is fixed.

SUMMARY OF THE INVENTION

The present invention improves upon the frame leveling and pitch adjustment arrangements of the prior art by providing a structure which is simple, safe and effective. In particular, a pair of frame lift links connect between the frame rockshafts and the piston of a single hydraulic cylinder which is connected to a rigidly connected tongue of the frame. The hitch member is pivoted on one arm of a bell crank which is pivotally connected to the tongue. The other arm of the crank is connected to the piston of the hydraulic ram. As the frame is lifted or lowered, the crank transfers the motion in reverse sense to the hitch for leveling purposes. The angular relationship of the arms of the bell crank is made adjustable by pivotally interrelating the arms and interconnecting the free ends of the arms by a turnbuckle. Adjustment of the length of the turnbuckle varies the angle between the arms of the crank and thus varies the pitch angle of the frame.

OBJECTS OF THE INVENTION

The principal objects of the present invention are: to provide an improved agricultural implement frame arrangement; to provide such an arrangement which employs a self-leveling mechanism for substantially maintaining the pitch angle of the frame in the raised transport position of the frame, the lowered ground working position, and positions therebetween; to provide such an arrangement including a frame pitch angle adjustment mechanism; to provide such an arrangement requiring adjustment by an operator to a level orientation only once for a given tractor draw bar height and implement tire size; to provide such an arrangement employing a single hydraulic ram for lifting and lowering the frame; to provide such an arrangement including a pair of elongated lift links which diverge from the hydraulic ram rearwardly to a pair of wheel lift levers; to provide such an arrangement wherein the lifting and lowering forces are transferred from the hydraulic ram to the hitch members by a bell crank; to provide such an arrangement which is simple in configuration to reduce maintenance requirements; to provide such an arrangement which positions all components which require adjustment near the hitch member for convenience and safety; and to provide such an agricultural implement frame arrangement which is economical to manufacture, positive and durable in operation, and which is particularly well adapted for its intended purpose.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a fragmentary plan view of an agricultural implement frame employing the leveling arrangement according to the present invention.

FIG. 2 is an enlarged, fragmentary, plan view of the front end of the implement frame and shows details of the frame pitch adjustment mechanism.

FIG. 3 is a longitudinal sectional view of the implement frame taken on line 3—3 of FIG. 1 and showing details of the leveling arrangement with the frame in a raised transport position.

FIG. 4 is a view similar to FIG. 3 and illustrates the implement frame in a lowered ground working position.

FIG. 5 is an enlarged, fragmentary side elevational view of the front end of the implement frame with portions broken away to illustrate details of the leveling arrangement of the present invention including a frame pitch adjustment mechanism.

DETAILED DESCRIPTION OF THE PREFERRED EMBODIMENTS

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail:

The reference numeral 1 generally designates an agricultural implement frame employing the hydraulic leveler arrangement 2 according to the present invention. The frame 1 includes ground engaging structure 3 which cooperates with a frame lift mechanism 4 to lift and lower the frame 1. The leveler arrangement 2 interconnects with the frame lift mechanism 4 and transfers the motions thereof through a hitch member 5 to a front end 6 of the frame 1 to substantially maintain the pitch angle or level orientation of the frame 1 as it is lifted and lowered between a ground working position and a transport position.

The leveler arrangement 2 may be employed on virtually any type of framework adapted to mount lateral rows of tillage tools and which is supported on a lateral row of tires. Referring to FIG. 1, the illustrated exemplary implement frame 1 includes a large central beam 10 which extends through a major portion of the frame 1 and extends forwardly of the front end 6 of the frame proper to form a tongue portion 11 of the frame 1. The frame 1 is built out around the central beam 10 and includes lateral beams 12 and longitudinal beams 13 interconnected to form a rigid structure. Diagonal beams 14 connect between the tongue 11 and middle portions of the frame 1 and transmit and distribute forces developed during turning of the frame 1. The frame 1 may include folding wing sections 15, fragments of which are illustrated in FIG. 1. Tillage tools, such as the discs 16 shown, may be mounted on the frame 1 in longitudinally spaced lateral rows.

The ground engaging structure 3 includes a pair of laterally spaced rockshaft stubs 20 which are pivotally connected to the frame 1. Each rockshaft 20 has a pair of upwardly extending ears 21 which provide for connection of the rockshaft to a pair of rear, outer longitudinal beams 13. Each rockshaft has a wheel arm 22 extending therefrom on which is rotatably mounted a ground engaging wheel 23 including a conventional wheel and pneumatic tire. A lift lever 25 extends upwardly from each rockshaft and pivotally connects with members of the frame lift mechanism 4. The rockshaft stubs 20 could be interconnected to form a single rockshaft member.

The frame lift mechanism 4 includes a single hydraulic cylinder or ram 28 which is pivotally connected to the top side of the tongue 11. The ram 28 is a double acting cylinder and pivotally connects with a pair of frame lift links 29 to form a lift pivot joint 30. The links extend divergingly from the lift pivot 30 toward the rear of the frame 1 and pivotally connect with the wheel lift levers 25 of the ground engaging structure 3. Upon extension of the ram 28, the wheel arms 22 are pivoted downward thereby lifting the frame 1 toward the transport position (FIG. 3). Retraction of the ram 28 raises the arms 22 thereby lowering the frame 1 toward the ground working position (FIG. 4).

The hitch member 5 provides for connection of the frame 1 to a draft vehicle or tractor (not shown). The hitch member 5 is connected to the frame 1 through the leveler arrangement 2, whereby the lifting and lowering motions of the frame lift mechanism 4 are transferred to the tongue 11 and thus to the front end 6 of the frame 1 in cooperation with the hitch member 5.

The illustrated leveler arrangement 2 is a truss which functions as a hitch bell crank 33. The crank 33 is pivotally connected to the tongue 11 forming a fulcrum pivot 34. The hitch member 5 is connected to a hitch pivot 35 of the crank 33, and the crank is connected to the lift pivot 30. The hitch bell crank 33 includes a pair of laterally spaced lift arms 38 extending between the fulcrum pivot 34 and the lift pivot 30 and a pair of laterally spaced hitch arms 39 extending between the fulcrum pivot 30 and the hitch pivot 35. A turnbuckle 40 is pivotally connected between the lift pivot 30 and the hitch arms 34, thus completing the truss. The turnbuckle 40 is adjustable in length whereby the angle between the lift arms 38 and the hitch arms 39 is adjustable. This provides for the adjustment of the pitch angle or front-to-back level relationship. As is illustrated in FIGS. 3–5, the hitch arms 39 are triangular in form with the fulcrum pivot 34 and the hitch pivot 35 at two of the corners. An additional pivot joint is provided at the third corner of the triangle, and it is this level transfer pivot 41 to which the turnbuckle 40 is connected. The connection of the turnbuckle 40 to the level transfer pivot 41 rather than the hitch pivot 35 allows the use of a shorter turnbuckle and also simplifies these two pivot joints thus economizing the structure.

In operation, the frame 1 is hitched to a tractor by means of the hitch member 5. If necessary, the turnbuckle 40 is adjusted to level the frame 1. This is usually only necessary the first time the frame is hitched to a tractor or if the size of the tires 23 has been changed. The tractor and frame 1 with tillage tools 16 are driven to a field for cultivation thereof. When the field is reached, the tillage tools 16 are lowered into engagement with the earth by retracting the cylinder 28. The force of the cylinder is transferred to the ground engagement structure 3 by the lift links 29. As the cylinder 28 is retracted, the hitch bell crank 33 is pivoted backward. Since the height of the hitch member 5 is relatively fixed by connection to the tractor, the front and rear portions of the frame 1 are lowered at approximately the same rate such that the pitch of the frame 1 is maintained. By this means, the degree of ground engagement of front and rear tillage tools 16 is balanced. When plowing is finished, the tillage tools 16 are raised by raising the frame 1 by a reverse process. The frame 1 may be locked in the raised or transport position by contact of the lift arms 38 with a transport lock pin 43 received in aligned apertures in a pair of upstanding transport lock lugs 44 as is shown in FIG. 5.

It is to be understood that while certain forms of the present invention have been illustrated and described herein, it is not to be limited to the specific forms or arrangement of parts described and shown.

What is claimed and desired to be secured by Letters Patent is as follows:

1. An agricultural frame apparatus comprising:
   (a) an agricultural implement frame mounting agricultural tools and having a front end;
   (b) ground engaging means connected to said frame, mobilely engaging the ground, and supporting said frame in one of a lowered ground working position, a raised transport position, and a position therebetween;
   (c) frame lift means connected between said frame and said ground engaging means and operable to move said frame between said positions;
   (d) hitch crank means pivotally connected to said front end of said frame to form a fulcrum pivot, said crank means including a lift arm pivotally connected to said fulcrum pivot and pivotally connected to said frame lift means to form a lift pivot and moving in response to the movement of said frame means and a hitch arm pivotally connected to said fulcrum pivot and having a hitch pivot at a free end thereof;
   (e) a hitch member connected to said hitch pivot of said hitch arm; and
   (f) frame pitch adjustment means cooperating with said lift arm and said hitch arm of said crank means, said adjustment means being adjustable to vary an angle between said lift arm and said hitch arm to thereby adjust the pitch angle of said frame.

2. An apparatus as set forth in claim 1 wherein said frame pitch adjustment means includes: (a) a turnbuckle pivotally connected to said lift arm and said hitch arm, said turnbuckle being adjustable in length to thereby adjust the angle between said lift and hitch arms.

3. In an agricultural frame apparatus including: an agricultural implement frame mounting agricultural tools; a draft tongue rigidly connected to said frame, extending forwardly of said frame and having a front end; a hitch member operatively connected to said tongue front end; ground engaging means mobilely engaging the ground and supporting said frame in one of a lowered ground working position, a raised transport position and a position therebetween; and frame lift means connected between said frame and said ground engaging means and operable to move said frame between said positions; the improvement comprising:
   (a) said frame lift means being a single extendible ram having a first end pivotally connected to said tongue and having a second end;
   (b) an elongated frame lift link pivotally connected to said second end of said ram to form a lift pivot and pivotally connected to said ground engaging means;
   (c) hitch crank means pivotally connected to said front end of said tongue to form a fulcrum pivot and having a hitch pivot and a level transfer pivot;
   (d) said hitch member being pivotally connected to said hitch pivot of said crank means;
   (e) a lift arm pivotally connected between said fulcrum pivot and said lift pivot; and
   (f) an adjustable level transfer link connected between said lift pivot and said level transfer pivot of said crank means to transfer the motion of said ram in reverse sense to said hitch member to substantially maintain the pitch orientation of said frame during raising and lowering thereof.

4. An apparatus as set forth in claim 3 including:
   (a) a pair of the frame lift links connected to said lift pivot and diverging to pivotally connect with said ground engaging means.

5. An apparatus as set forth in claim 4 wherein said ground engaging means includes:
   (a) a pair of laterally spaced wheel levers pivotally connected to said frame; and
   (b) each wheel lever having a ground engaging wheel rotatably mounted at one end and having a respective frame lift link pivotally connected to an opposite end thereof.

6. An apparatus as set forth in claim 3 wherein said hitch crank means includes:
   (a) a pair of triangularly shaped hitch plates; and
   (b) a hitch crank spacer positioned between said plates at each of said fulcrum, lift and hitch pivots to thereby laterally space said plates.

7. An apparatus as set forth in claim 3 including:
   (a) a pair of the lift arms pivotally connected between said fulcrum pivot and said lift pivot, said lift arms being spaced apart laterally and functioning as a unit.

8. An apparatus as set forth in claim 3 wherein:
   (a) said adjustable level transfer link is a turnbuckle, the length of said turnbuckle being adjustable to thereby adjust the pitch angle of said frame.

9. An agricultural frame apparatus comprising:
   (a) an agricultural implement frame mounting agricultural tools and having a front end;
   (b) a pair of laterally spaced frame lift wheel levers pivotally connected to said frame, each wheel lever having a ground engaging wheel rotatably mounted at one end and having an ear extending therefrom, said wheel levers and wheels mobilely supporting said frame in one of a lowered ground working position, a raised transport position, and a position therebetween;
   (c) a single extendible ram pivotally connected to said front end of said frame;
   (d) a pair of elongated frame lift links pivotally connected to said ram to form a lift pivot and diverging to pivotally connect respectively to said ears of said wheel levers to transfer the motion of said ram to said wheel levers to thereby move said frame between said positions;
   (e) a pair of laterally spaced hitch crank plates pivotally connected to said front end of said frame to form a fulcrum pivot and having a hitch pivot and a level transfer pivot;

(f) a hitch member pivotally connected to said hitch pivot of said plates to hitch said frame to a draft vehicle;

(g) a pair of laterally spaced lift arms pivotally connected between said fulcrum pivot and said lift pivot; and (h) a turnbuckle connected between said lift pivot and said level transfer pivot of said crank plates to transfer the motion of said ram in reverse sense to said hitch member to substantially maintain the pitch angle of said frame during raising and lowering thereof and to allow adjustment of the pitch angle of said frame by adjustment of the length of said turnbuckle.

10. An agricultural frame apparatus comprising:

(a) an agricultural implement frame mounting agricultural tools and having a front end;

(b) ground engaging means connected to said frame, mobilely engaging the ground, and supporting said frame in one of a lowered ground working position, a raised transport position, and a position therebetween;

(c) frame lift means connected between said frame and said ground engaging means and operable to move said frame between said positions;

(d) hitch crank means pivotally connected to said front end of said frame to form a fulcrum pivot, said crank means including a lift arm pivotally connected to said fulcrum pivot and pivotally connected to said frame lift means to form a lift pivot and a hitch arm pivotally connected to said fulcrum pivot and having a hitch pivot at a free end thereof;

(e) a hitch member connected to said hitch pivot of said hitch arm;

(f) frame pitch adjustment means cooperating with said lift arm and said hitch arm of said crank means, said adjustment means being adjustable to vary an angle between said lift arm and said hitch arm to thereby adjust the pitch angle of said frame; and (g) said frame lift means including:
(1) a single extendible ram having a first end pivotally connected to said frame and a second end connected to said lift pivot; and
(2) a pair of frame lift links connected to said lift pivot and diverging rearwardly of said frame to pivotally connect to said ground engaging means.

11. An apparatus as set forth in claim 10 wherein said ground engaging means includes:

(a) a pair of laterally spaced wheel levers pivotally connected to said frame; and (b) each wheel lever having a ground engaging wheel rotatably mounted at one end and having a respective frame lift link pivotally connected to an opposite end thereof.

12. An agricultural frame apparatus comprising:

(a) an agricultural implement frame mounting agricultural tools and having a front end;

(b) ground engaging means connected to said frame, mobilely engaging the ground, and supporting said frame in one of a lowered ground working position, a raised transport position, and a position therebetween;

(c) frame lift means connected between said frame and said ground engaging means and operable to move said frame between said positions;

(d) hitch crank means pivotally connected to said front end of said frame to form a fulcrum pivot, said crank means including a lift arm pivotally connected to said fulcrum pivot and pivotally connected to said frame lift means to form a lift pivot and a hitch arm pivotally connected to said fulcrum pivot and having a hitch pivot at a free end thereof;

(e) a pair of the lift arms pivotally connected between said fulcrum pivot and said lift pivot, said lift arms being laterally spaced apart, interconnected, and functioning as a unit;

(f) said hitch arm including a pair of interconnected laterally spaced hitch plates connected to said fulcrum pivot and having a hitch member connected to said hitch pivot, said hitch plates including means forming a level transfer pivot;

(g) frame pitch adjustment means cooperating with said lift arm and said hitch arm of said crank means, said adjustment means being adjustable to vary an angle between said lift arm and said hitch arm to thereby adjust the pitch angle of said frame; and (h) said frame pitch adjustment means including a turnbuckle connected between said lift pivot and said level transfer pivot, said turnbuckle being adjustable in length to thereby adjust the pitch angle of said frame.

* * * * *